US008208233B2

(12) United States Patent
Lin

(10) Patent No.: US 8,208,233 B2
(45) Date of Patent: Jun. 26, 2012

(54) ESD PROTECTION CIRCUIT AND METHOD THEREOF

(75) Inventor: I-Cheng Lin, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 362 days.

(21) Appl. No.: 12/050,175

(22) Filed: Mar. 18, 2008

(65) Prior Publication Data
US 2009/0237846 A1    Sep. 24, 2009

(51) Int. Cl.
*H02H 9/00* (2006.01)
(52) U.S. Cl. ........................................................ 361/56
(58) Field of Classification Search .................. 361/56
See application file for complete search history.

(56) References Cited

U.S. PATENT DOCUMENTS

| 5,543,650 | A  | * | 8/1996  | Au et al. ........................ 257/355 |
| 5,637,900 | A  | * | 6/1997  | Ker et al. ....................... 257/355 |
| 5,818,087 | A  | * | 10/1998 | Yee ................................ 257/355 |
| 6,426,244 | B2 | * | 7/2002  | Hargrove et al. .............. 438/149 |
| 6,459,553 | B1 | * | 10/2002 | Drapkin et al. ................. 361/56 |
| 6,690,557 | B2 | * | 2/2004  | Hung et al. ...................... 361/56 |
| 6,949,965 | B1 | * | 9/2005  | Jurgilewicz et al. .......... 327/143 |
| 6,972,446 | B1 | * | 12/2005 | Atsumi .......................... 257/208 |
| 7,027,275 | B2 | * | 4/2006  | Smith ............................. 361/56 |
| 7,292,076 | B2 | * | 11/2007 | Jurgilewicz et al. .......... 327/143 |
| 7,385,793 | B1 | * | 6/2008  | Ansel et al. ..................... 361/56 |
| 7,589,945 | B2 | * | 9/2009  | Miller et al. .................... 361/56 |
| 2002/0080536 | A1 | * | 6/2002 | Clark et al. ..................... 361/56 |
| 2003/0202311 | A1 | * | 10/2003 | Duvvury ....................... 361/111 |
| 2005/0083623 | A1 |   | 4/2005  | Yeh |
| 2006/0008977 | A1 | * | 1/2006 | Tran ............................... 438/239 |
| 2006/0018066 | A1 | * | 1/2006 | Litwin et al. ................... 361/56 |
| 2006/0028776 | A1 | * | 2/2006 | Stockinger et al. ............. 361/56 |
| 2006/0033539 | A1 | * | 2/2006 | Jurgilewicz et al. .......... 327/143 |
| 2006/0186474 | A1 | * | 8/2006 | Matsumoto et al. .......... 257/347 |
| 2007/0007597 | A1 | * | 1/2007 | Yach et al. ..................... 257/355 |
| 2007/0058419 | A1 | * | 3/2007 | Khellah et al. ................ 365/154 |
| 2007/0148937 | A1 | * | 6/2007 | Yagishita et al. .............. 438/585 |
| 2007/0247772 | A1 | * | 10/2007 | Keppens et al. ................ 361/56 |
| 2007/0287404 | A1 | * | 12/2007 | Arnborg ........................ 455/333 |
| 2008/0035996 | A1 | * | 2/2008 | Matsumoto et al. .......... 257/347 |
| 2008/0062596 | A1 | * | 3/2008 | Miller et al. .................... 361/56 |
| 2008/0093699 | A1 | * | 4/2008 | Abe et al. ....................... 257/499 |
| 2009/0323234 | A1 | * | 12/2009 | Bach ............................... 361/56 |
| 2010/0090284 | A1 | * | 4/2010 | Liao et al. ..................... 257/355 |

FOREIGN PATENT DOCUMENTS

TW    200532888 A  * 10/2005

* cited by examiner

*Primary Examiner* — Ronald W Leja
(74) *Attorney, Agent, or Firm* — Winston Hsu; Scott Margo

(57) ABSTRACT

The present invention provides an ESD protection circuit, including: a first protecting circuit coupled between a first pad and a second pad, the first protecting circuit including a first discharge transistor; and a second protecting circuit coupled to the first pad and the second pad, the second protecting circuit including a second discharge transistor. One of the first and second discharge transistors is a high-voltage component, and the other of the first and second discharge transistors is a low-voltage component.

14 Claims, 6 Drawing Sheets

ESD PROTECTION CIRCUIT AND METHOD THEREOF

BACKGROUND

The present invention relates to an electrostatic discharge (ESD) protection scheme, and more particularly, to an electrostatic discharge protection circuit of which discharge elements have different characteristics, and a method thereof.

FIG. 1 is a diagram illustrating a prior art electrostatic discharge (ESD) protection circuit 10, which is utilized for protecting an integrated device 20 from being damaged by electrostatic discharging. The ESD protection circuit 10 comprises a low pass filter 11 consisting of a resistor R and a capacitor C; an inverter 12 consisting of a PMOS transistor $M_{pa}$ and an NMOS transistor $M_{na}$; and a discharging circuit 13 consisting of an NMOS transistor $M_{nb}$. The connections between the low pass filter 11, the inverter 12, and the discharging circuit 13 are shown in FIG. 1. Furthermore, a first pad 14 is coupled to a terminal $N_1$, a second pad 15 is coupled to a terminal $N_2$, a third pad 16 is coupled to a terminal $N_5$ for receiving an input signal to the integrated device 20, and two diodes $D_1$, $D_2$ are coupled to the terminal $N_5$ for protecting the integrated device 20 from being damaged by the electrostatic discharging (ESD) signal that appears at the third pad 16.

Initially, the PMOS transistor $M_{pa}$, the NMOS transistor $M_{na}$, and the NMOS transistor $M_{nb}$ are turned off. When the electrostatic discharging signal (the voltage $V_a$) is induced to the first pad 14 or the third pad 16, the PMOS transistor $M_{pa}$ will suddenly be turned on, and therefore the voltage at the terminal $N_4$ will be charged instantaneously for turning on the NMOS transistor $M_{nb}$ in order to discharge the voltage $V_a$. Meanwhile, the low pass filter 11 proceeds to perform low pass filtering upon the voltage $V_a$ to generate the voltage $V_c$, so as to gradually increase the voltage $V_c$ because of the low pass filtering characteristics of the resistor R and the capacitor C. After a time interval $\Delta t'$, the voltage $V_c$ will turn on the NMOS transistor $M_{na}$ to discharge the terminal $N_4$. Then, the PMOS transistor $M_{pa}$ and the NMOS transistor $M_{nb}$ will be turned off. As can be seen from this description, the NMOS transistor $M_{na}$, the PMOS transistor $M_{pa}$, and the NMOS transistor $M_{nb}$ typically are core devices, i.e. the low-voltage components, for increasing the sensitivity of the ESD protection circuit 10.

However, the low-voltage components, which can rapidly discharge the ESD signal, generally have large leakage currents. When the number of integrated devices increases, the number of ESD protection circuits needs to increase accordingly. Under the static condition, a very large leakage current will be generated due to all of the ESD protection circuits utilizing the low-voltage components.

SUMMARY OF THE INVENTION

One of the objectives of the present invention is therefore to provide an electrostatic discharge (ESD) protection circuit of which the discharge elements have different characteristics, and a method thereof.

According to an embodiment of the present invention, an ESD protection circuit is disclosed. The ESD protection circuit comprises a first protecting circuit and a second protecting circuit. The first protecting circuit is coupled between a first pad and a second pad, and comprises a first discharge transistor. The second protecting circuit is coupled to the first pad and the second pad, and comprises a second discharge transistor; wherein one of the first and second discharge transistors is a high-voltage component, and the other of the first and second discharge transistors is a low-voltage component.

According to another embodiment of the present invention, an ESD protection method is disclosed. The ESD protection method comprises the steps of: providing a first protecting circuit to couple between a first pad and a second pad, the first protecting circuit comprising a first discharge transistor; and providing a second protecting circuit to couple to the first pad and the second pad, the second protecting circuit comprising a second discharge transistor; wherein one of the first and second discharge transistors is fabricated by a first semiconductor process, and the other of the first and second discharge transistors is fabricated by a second semiconductor process, and the first semiconductor process is different from the second semiconductor process.

According to another embodiment of the present invention, an ESD protection circuit is disclosed. The ESD protection circuit comprises a first protecting circuit and a second protecting circuit. The first protecting circuit has a low-voltage component directly coupled between a power pad and a ground pad. The second protecting circuit has a high-voltage component directly coupled between the power pad and the ground pad.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
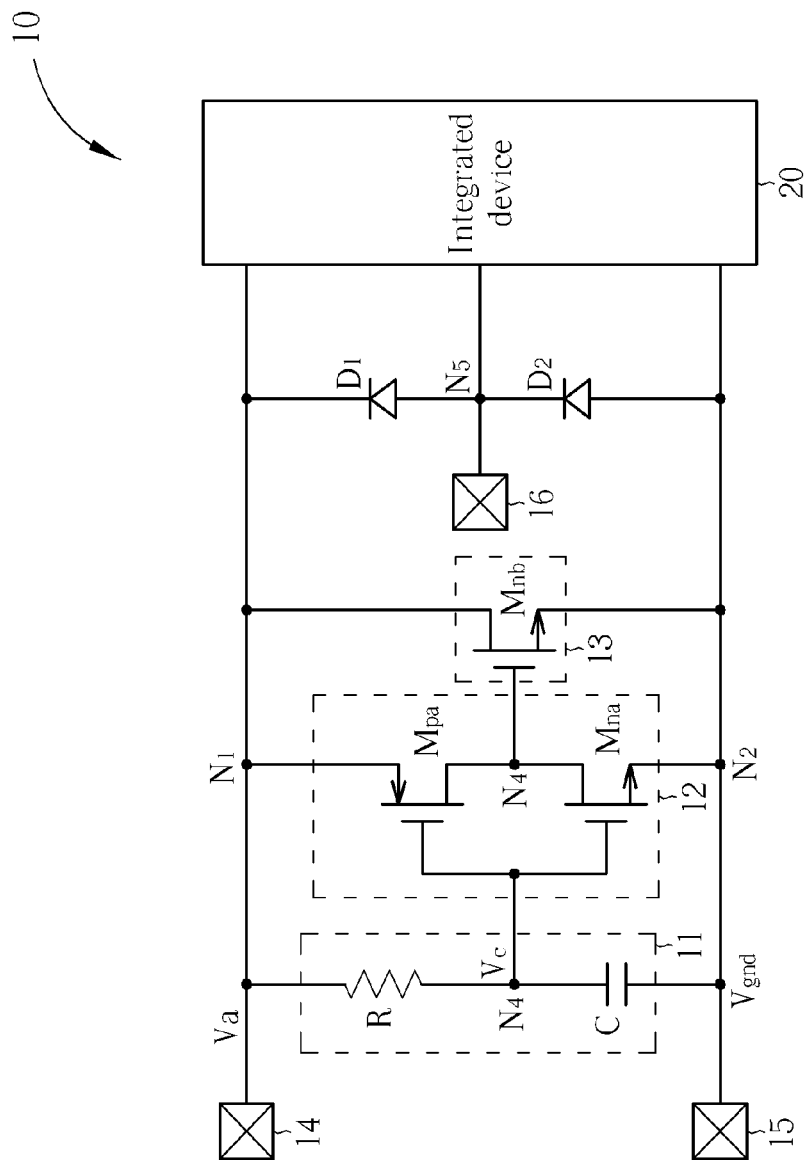
FIG. 1 is a diagram illustrating a prior art electrostatic discharge (ESD) protection circuit.
Figure 2:
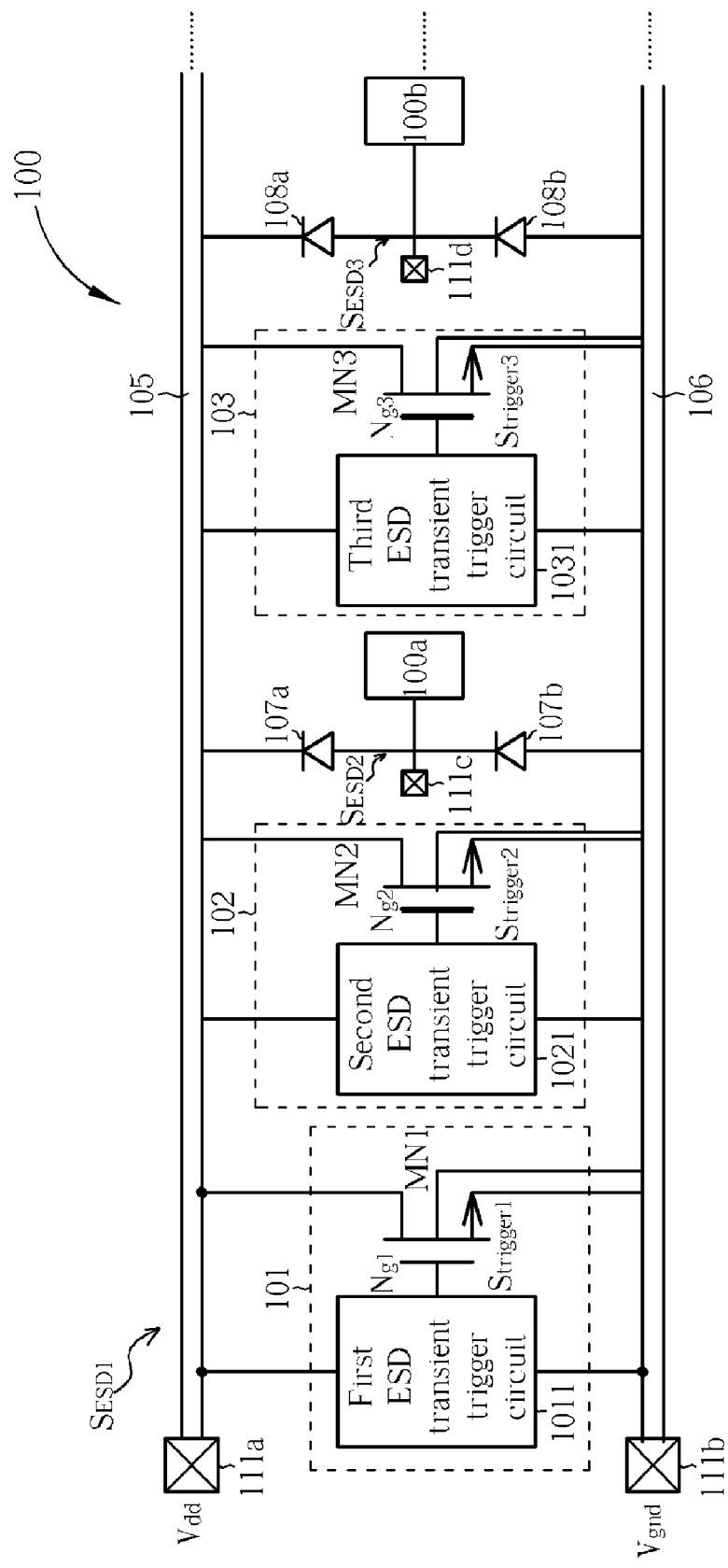
FIG. 2 is a diagram illustrating an ESD protection circuit according to an embodiment of the present invention.

FIG. 2 is a diagram illustrating an ESD protection circuit 100 according to an embodiment of the present invention. The ESD protection circuit 100 is utilized for protecting at least one functional circuit 100a, 100b from damage due to an ESD signal, where the ESD signal may appear at power pad 111a, ground pad 111b, or I/O (input/output) pads 111c, 111d. The ESD protection circuit 100 comprises a first protecting circuit 101, a second protecting circuit 102, and a third protecting circuit 103. The first protecting circuit 101 is coupled between the power pad 111a and the ground pad 111b. The first protecting circuit 101 comprises a first ESD transient trigger circuit 1011 and a first discharge transistor MN1. The second protecting circuit 102 is coupled between the power pad 111a and the ground pad 111b. The second protecting circuit 102 comprises a second ESD transient trigger circuit 1021 and a second discharge transistor MN2. The third protecting circuit 103 is coupled between the power pad 111a and the ground pad 111b. The third protecting circuit 103 comprises a third ESD transient trigger circuit 1031 and a third discharge transistor MN3. For example, inverters can be used to implement the ESD transient trigger circuits mentioned above, i.e. 1010, 1021, and 1031. The ESD protection circuit 100 further comprises a power bus 105 and a ground bus 106. The power bus 105 is coupled to the power pad 111a for conducting a supply voltage $V_{dd}$ to the functional circuits 100a, 100b, and the ground bus 106 is coupled to the ground pad 111b for conducting a ground voltage $V_{gnd}$ to the functional circuits 100a, 100b. Furthermore, in practice, the first protecting circuit 101 may be located closer to the power pad 111a and the ground pad 111b than the second protecting circuit 102 and the third protecting circuit 103. In addition, the first functional circuit 100a is coupled to the I/O pad 111c and the second functional circuit 100b is coupled to the I/O pad 111d, respectively. A discharging element, e.g. a diode 107a, is coupled between the power pad 111a and the I/O pad 111c, and another discharging element, e.g. diode 107b, is coupled between the ground pad 111b and the I/O pad 111c. A discharging element, e.g. diode 108a, is coupled between the power pad 111a and the I/O pad 111d, and another discharging element, e.g. diode 108b, is coupled between the ground pad 111b and the I/O pad 111d. According to the embodiment, the first discharge transistor MN1 is a low-voltage component, and the second discharge transistor MN2 and the third discharge transistor MN3 are high-voltage components. Please note that those skilled in this art will readily understand that whether a transistor is classified as a low-voltage component or a high-voltage component is defined by the threshold voltage (Vth) of the transistor. In other words, an I/O device can be utilized for implementing the high-voltage component, and a core device can be utilized for implementing the low-voltage component.

Please refer to FIG. 2 again. The first discharge transistor MN1 has a gate terminal $N_{g1}$ coupled to the first ESD transient trigger circuit 1011. Similarly, the second discharge transistor MN2 has a gate terminal $N_{g2}$ coupled to the second ESD transient trigger circuit 1021, and the third discharge transistor MN3 has a gate terminal $N_{g3}$ coupled to the third ESD transient trigger circuit 1031. When the ESD transient trigger circuit 1011, 1021 or 1031 detects an ESD signal, e.g. $S_{ESD1}$ at the power pad 111a, $S_{ESD2}$ at the I/O pad 111c or $S_{ESD3}$ at the I/O pad 111d, the ESD transient trigger circuit 1011, 1021 or 1031 generates a trigger signal $S_{trigger1}$, $S_{trigger2}$, or $S_{trigger3}$ to turn on the discharge transistor MN1, MN2 or MN3 for discharging the ESD signal, respectively. That is, in practice, the ESD signal $S_{ESD2}$ appearing at the I/O PAD 111c (or the ESD signal $S_{ESD3}$ appearing at the I/O PAD 111d) is conducted to the power bus 105 and the ground bus 106 through the diodes 107a, 107b (or the diodes 108a, 108b), and then all of the protecting circuits (i.e. 101, 102, and 103) can eliminate or reduce the ESD signal $S_{ESD2}$ (or $S_{ESD3}$).

As the first discharge transistor MN1 is the core device (i.e. the low-voltage component), and the second discharge transistor MN2 and the third discharge transistor MN3 are the I/O devices (i.e. the high-voltage component), the threshold voltage of the first discharge transistor MN1 is lower than the threshold voltages of the second discharge transistor MN2 and the third discharge transistor MN3. Please note that, as the operation of the second protecting circuit 102 and the third protecting circuit 103 is the same, the following description only discloses the operation of the second protecting circuit 102 for brevity.

Figure 3:
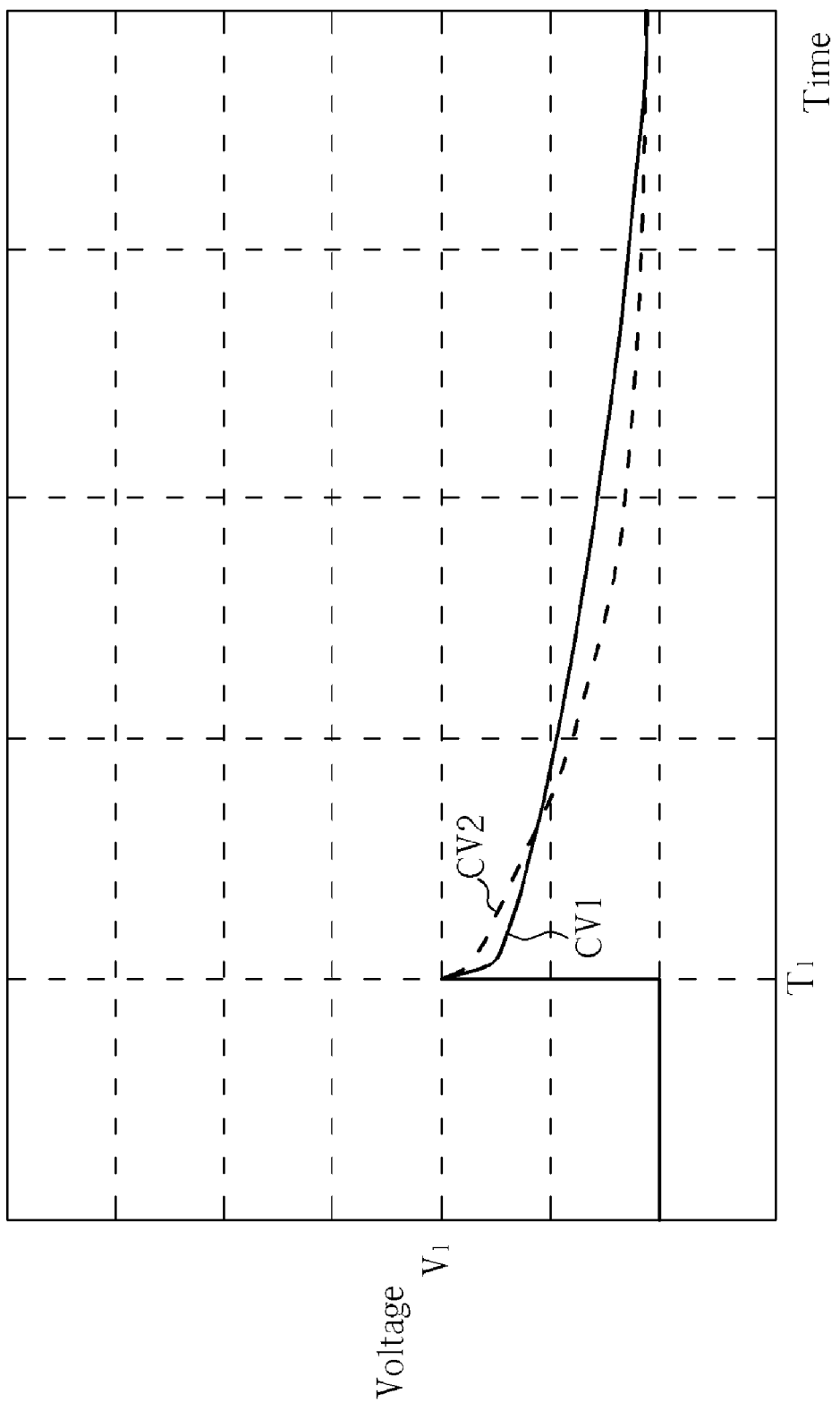
FIG. 3 is a diagram of a first simulation result showing an ESD transient response voltage curve CV1 of a prior art protecting circuit having all six low-voltage FET transistors and an ESD transient response voltage curve CV2 of the protecting circuit of FIG. 2.
Figure 4:
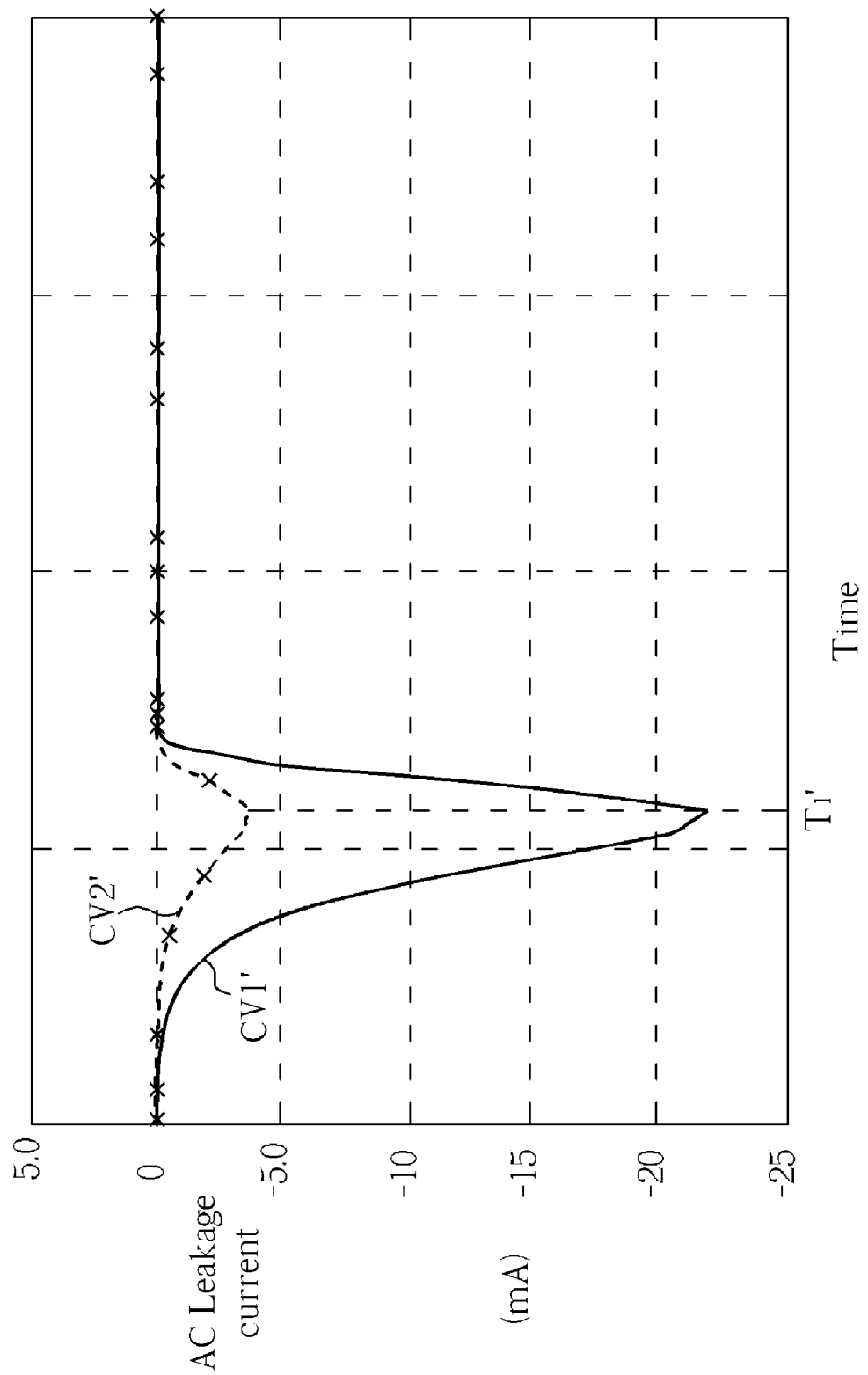
FIG. 4 is a diagram of a second simulation result showing amounts of AC leakage currents during the ESD transient responses of the prior art protecting circuit having all six low-voltage FET transistors and the protecting circuit shown in FIG. 2.
Figure 5:
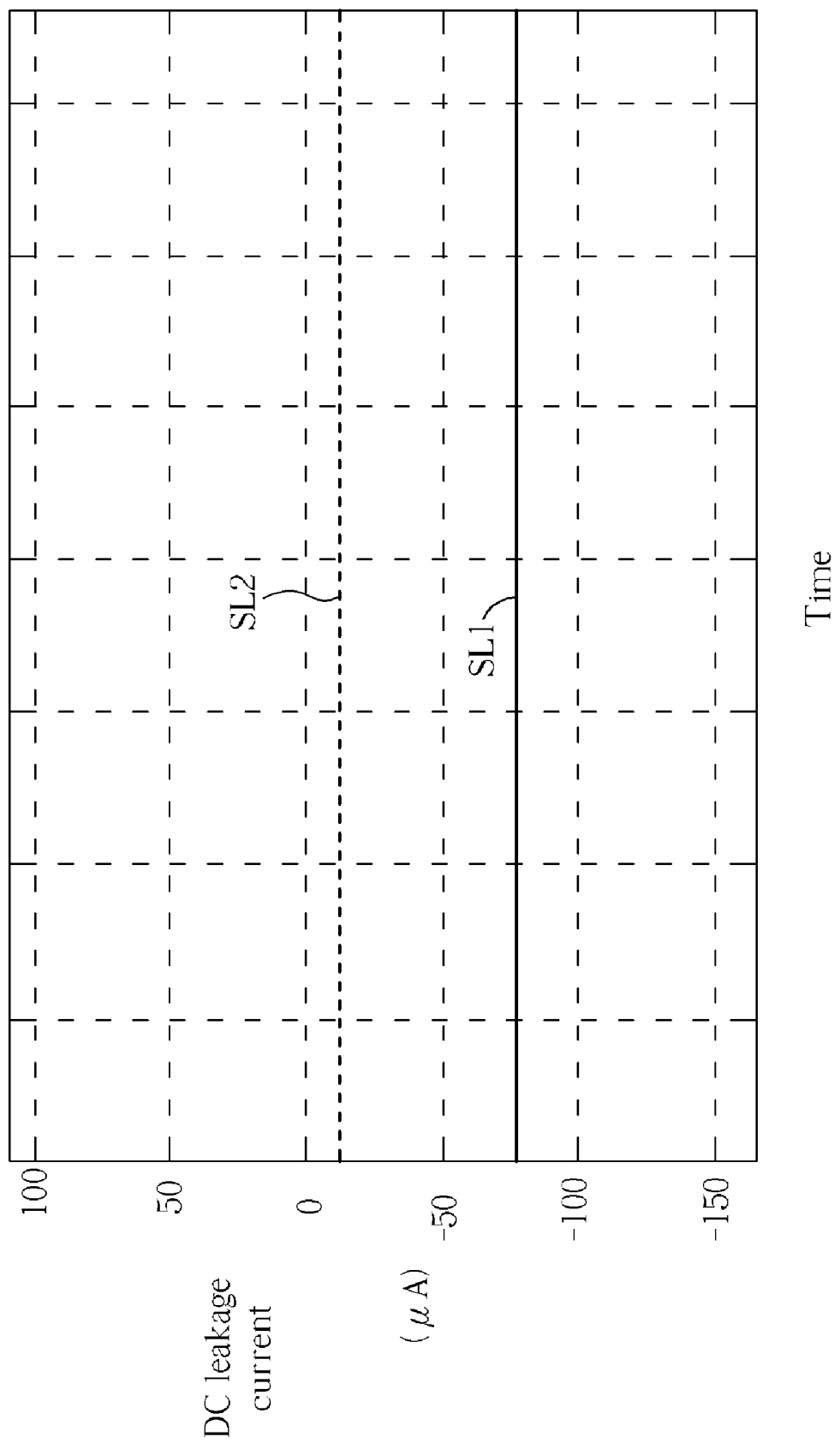
FIG. 5 is a diagram of a third simulation result showing amounts of DC leakage currents during the ESD transient responses of the prior art protecting circuit having all six low-voltage FET transistors and the protecting circuit shown in FIG. 2 respectively under power-up condition.

Please refer to FIG. 3-5. FIG. 3 is a diagram of a first simulation result showing an ESD transient response voltage curve CV1 of a prior art protecting circuit having all six low-voltage FET transistors and an ESD transient response voltage curve CV2 of the ESD protection circuit 100 of FIG. 2. FIG. 4 is a diagram of a second simulation result showing amounts of AC leakage currents during the ESD transient responses of the prior art protecting circuit having all six low-voltage FET transistors and the ESD protection circuit 100 shown in FIG. 2 respectively under power-up condition. FIG. 5 is a diagram of a third simulation result showing amounts of DC leakage currents during the ESD transient responses of the prior art protecting circuit having all six low-voltage FET transistors and the ESD protection circuit 100 shown in FIG. 2 respectively under power-up condition.

In this simulation result, the ESD protection circuit 100 is assumed to have six protecting circuits, and for example, is implemented by one low-voltage component and five high-voltage components in its protecting circuits. It is assumed that ESD signals are induced at timing $T_1$ so that values of the voltage curves CV1 and CV2 are charged to a voltage level $V_1$ immediately, and then the ESD protection circuit 100 and prior art protecting circuit both perform ESD protection. As shown in FIG. 3, the voltage curve CV2 is approximate to the voltage curve CV1 considerably. Even the rate of discharging the voltage $V_1$ introduced by the ESD signals for the ESD protection circuit 100 is lower than that for the prior art protecting circuit initially, it is acceptable since the difference between the discharging rates is insignificant.

Referring to FIG. 4, a curve CV1' is representative of amount of the AC leakage current caused by the ESD protection of the prior art protecting circuit having all six low-voltage components, and a curve CV2' is representative of amount of the AC leakage current caused by the ESD protection of the ESD protection circuit 100, respectively. Obviously, during power-up condition, the difference between values of the curves CV1' and CV2' reaches a maximum difference at timing T1', That is, by using the ESD protection circuit 100 of FIG. 2, which utilizes more high-voltage components than the prior art protection circuit, the amount of AC leakage current can be reduced substantially. Additionally, referring to FIG. 5, a line SL1 is representative of amount of the DC leakage current caused by the ESD protection of the prior art protecting circuit having all six low-voltage components, and a line SL2 is representative of amount of the DC leakage current caused by the ESD protection of the ESD protection circuit 100, respectively. During power-up condition, it is observed that amount of the DC leakage current corresponding to the line SL2 is rather smaller than that corresponding to the line SL1. It should be noted that the AC and DC leakage currents are represented by negative values in FIG. 4 and FIG. 5. This is only used for illustrative purposes herein. According to the above-mentioned simulation results, it is appreciated that the ESD protection circuit 100 shown in FIG. 2 can achieve the purpose of avoiding large AC and DC leakage currents, without degrading the discharging rate of ESD protection.

Please note that those skilled in this art will readily understand that the distinction between the low-voltage component and the high-voltage component can also be alternatively defined by the gate oxide thickness of the transistor, the junction breakdown voltage of the transistor, the well doping density of the transistor, the static leakage current of the transistor, or their combinations. Therefore, different semiconductor processes can be selectively utilized to obtain the low-voltage component and the high-voltage component, respectively, fabricating the discharge transistors in the embodiment. Furthermore, according to the embodiment of the present invention, elements included in the first ESD transient trigger circuit 1011, the second ESD transient trigger circuit 1021, and the third ESD transient trigger circuit 1031 can be fabricated by either the low-voltage components or the high-voltage components.

Figure 6:
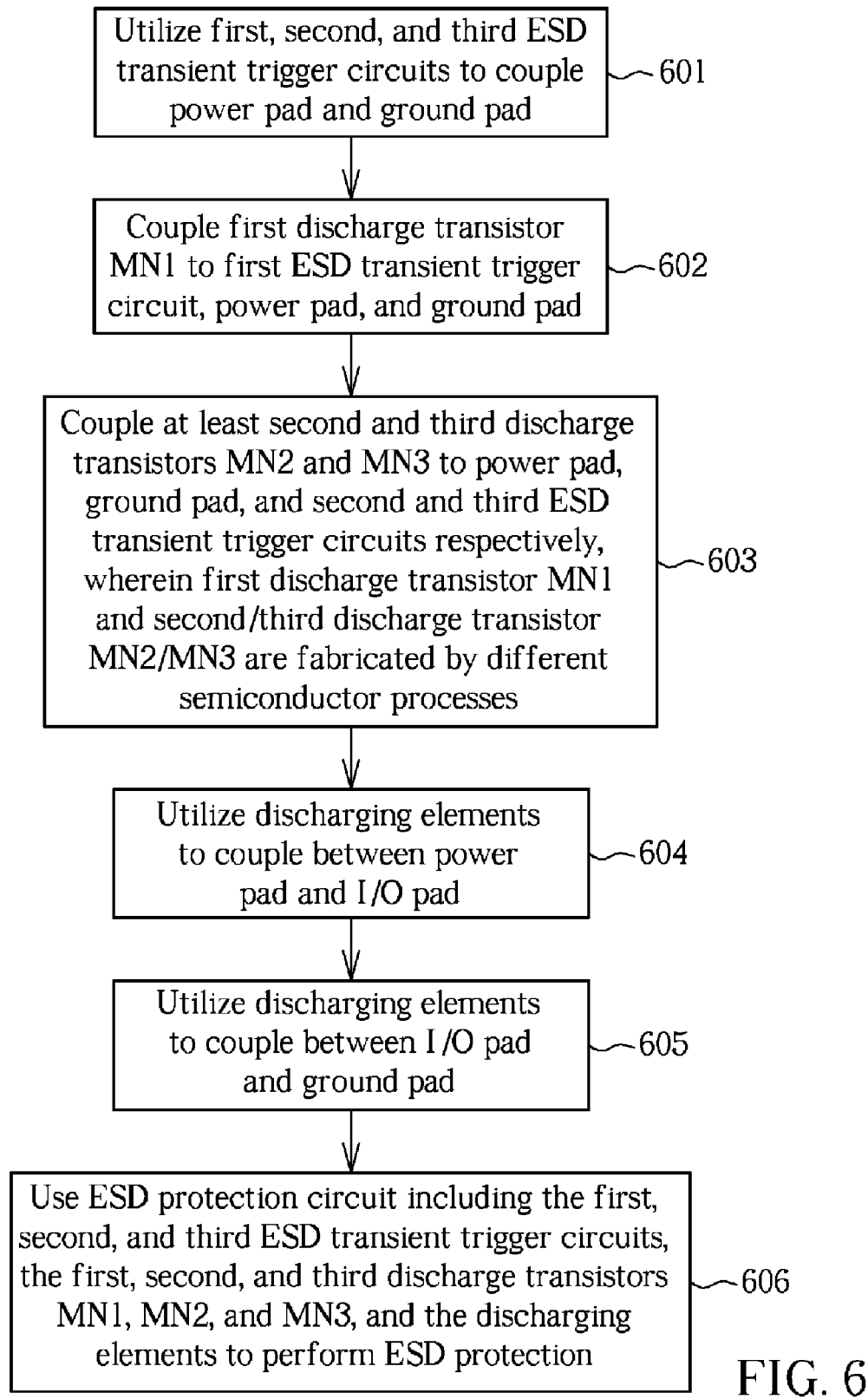
FIG. 6 is a flowchart illustrating an ESD protection method according to a second embodiment of the present invention.

FIG. 6 is a flowchart illustrating an ESD protection method according to a second embodiment of the present invention. For brevity, the ESD protection method is described in accordance with the ESD protection circuit 100 as shown in FIG. 2. Provided that substantially the same result is achieved, the steps of the flowchart shown in FIG. 6 need not be in the exact order shown and need not be contiguous, that is, other steps can be intermediate. The ESD protection method comprises the following steps:

Step 601: Utilize the first ESD transient trigger circuit 1010, second ESD transient trigger circuit 1021, and the third ESD transient trigger circuit 1031 to couple the power pad 111a and ground pad 111b;

Step 602: Couple the first discharge transistor MN1 to the first ESD transient trigger circuit 1011, power pad 111a, and the ground pad 111b;

Step 603: Couple the second and third discharge transistors MN2 and MN3 to the power pad 111a, ground pad 111b, and the second and third ESD transient trigger circuits 1021 and 1031 respectively, wherein the first discharge transistor MN1 (i.e. a low-voltage component) and the second/third discharge transistor MN2/MN3 (i.e. a high-voltage component) are fabricated by different semiconductor processes;

Step 604: Couple the diode 107a between the power pad 111a and the I/O pad 111c; and couple the diode 108a between the power pad 111a and the I/O pad 111d;

Step 605: Couple the diode 107b between the ground pad 111b and the I/O pad 111c; and couple the diode 108b between the ground pad 111b and the I/O pad 111d; and Step 606: Use the ESD protection circuit 100 including the first, second, and third ESD transient trigger circuits 1011, 1021, and 1031, the first, second, and third discharge transistors MN1, MN2, and MN3, and the diodes 107a, 107b, 108a, and 108b to perform ESD protection.

Please note that those skilled in this art will readily understand that the distinction between the low-voltage component and the high-voltage component can be defined by the threshold voltage (Vth) of the transistor, the gate oxide thickness of the transistor, the junction breakdown voltage of the transistor, the well doping density of the transistor, the static leakage current of the transistor, or other suitable characteristics known in the semiconductor field.

Those skilled in the art will readily observe that numerous modifications and alterations of the device and method may be made while retaining the teachings of the invention.

What is claimed is:

1. An electrostatic discharge (ESD) protection circuit, comprising:
    a first protecting circuit having a low-voltage component directly coupled between a power pad and a ground pad; and
    a second protecting circuit having a high-voltage component directly coupled between the power pad and the ground pad;
    wherein the high-voltage component and the low-voltage component are defined by different gate oxide thicknesses of transistors.

2. The ESD protection circuit of claim 1, further comprising:
    a first discharging element, coupled between the power pad and an I/O pad; and
    a second discharging element, coupled between the ground pad and the I/O pad.

3. The ESD protection circuit of claim 1, wherein the first protecting circuit further comprises:
    a first ESD transient trigger circuit, coupled to the low-voltage component, the power pad, and the ground pad, wherein the first ESD transient trigger circuit is arranged to conduct the low-voltage component while detecting an ESD signal; and
    the second protecting circuit further comprises:
    a second ESD transient trigger circuit, coupled to the high-voltage component, the power pad, and the ground pad, wherein the second ESD transient trigger circuit is arranged to conduct the high-voltage component while detecting the ESD signal.

4. The ESD protection circuit of claim 1, wherein the high-voltage component is an I/O device, and the low-voltage component is a core device.

5. An ESD protection circuit, comprising:
    a first protecting circuit, directly coupled between a first pad and a second pad, the first protecting circuit comprising a first discharge transistor; and
    a second protecting circuit, directly coupled between the first pad and the second pad, the second protecting circuit comprising a second discharge transistor;
    wherein one of the first and second discharge transistors is a high-voltage component, the other of the first and second discharge transistors is a low-voltage component, and the high-voltage component and the low-voltage component are defined by different gate oxide thicknesses of transistors.

6. The ESD protection circuit of claim 5, wherein the first protecting circuit further comprises:
    a first ESD transient trigger circuit, coupled to the first pad and the second pad, wherein the first discharge transistor is coupled to the first ESD transient trigger circuit, the first pad, and the second pad; and
    the second protecting circuit further comprises:
    a second ESD transient trigger circuit, coupled to the first pad and the second pad, wherein the second discharge transistor is coupled to the second ESD transient trigger circuit, the first pad, and the second pad.

7. The ESD protection circuit of claim 5, wherein the high-voltage component is an I/O device, and the low-voltage component is a core device.

8. The ESD protection circuit of claim 5, further comprising:

a first discharging element, coupled between the first pad and a third pad; and a second discharging element, coupled between the second pad and the third pad.

9. The ESD protection circuit of claim 8, wherein the first pad is a power pad, the second pad is a ground pad, and the third pad is an I/O pad.

10. An ESD protection method, comprising:
(a) providing a first protecting circuit to directly couple between a first pad and a second pad, the first protecting circuit comprising a first discharge transistor; and
(b) providing a second protecting circuit to directly couple between the first pad and the second pad, the second protecting circuit comprising a second discharge transistor;
wherein one of the first and second discharge transistors is fabricated by a first semiconductor process, and the other of the first and second discharge transistors is fabricated by a second semiconductor process, the first semiconductor process is different from the second semiconductor process, one of the first and second semiconductor processes generates a high-voltage component, the other of the first and second semiconductor processes generates a low-voltage component, and the high-voltage component and the low-voltage component are defined by different gate oxide thicknesses of transistors.

11. The ESD protection method of claim 10, wherein the high-voltage component is an I/O device, and the low-voltage component is a core device.

12. The ESD protection method of claim 10, wherein the step (a) further comprises:
utilizing a first ESD transient trigger circuit to couple to the first pad and the second pad, and coupling the first discharge transistor to the first ESD transient trigger circuit, the first pad, and the second pad; and the step (b) further comprises:
utilizing a second ESD transient trigger circuit to couple to the first pad and the second pad, and coupling the second discharge transistor to the second ESD transient trigger circuit, the first pad, and the second pad.

13. The ESD protection method of claim 10, further comprising:
utilizing a first discharging element to couple between the first pad and a third pad; and
utilizing a second discharging element to couple between the second pad and the third pad.

14. The ESD protection method of claim 13, wherein the first pad is a power pad, the second pad is a ground pad, and the third pad is an I/O pad.

* * * * *